April 11, 1967    L. FILEPP    3,313,124

FLEXIBLE COUPLING

Filed Nov. 27, 1964

INVENTOR.
LESLIE FILEPP
BY
Thomas A. Mayner
ATTORNEY

United States Patent Office 3,313,124
Patented Apr. 11, 1967

3,313,124
FLEXIBLE COUPLING
Leslie Filepp, Colts Neck, N.J., assignor to Midland-Ross Corporation, Cleveland, Ohio, a corporation of Ohio
Filed Nov. 27, 1964, Ser. No. 414,155
2 Claims. (Cl. 64—9)

This invention relates to flexible couplings for shafts, more particularly, to attendance-free torsionally resilient couplings of the self-aligning gear type.

There is a substantial area in power transmission where a lubricated, metal, gear type coupling is not required but is used instead of one that is self-lubricating and attendance free. Lubricants, such as oil or grease, while necessary with all metal type couplings are eliminated, as by the present invention, in a coupling having a sleeve member of a unique self-lubricating, high tensile, torsionally resilient, tough material.

Synthetic couplings are available where only parts or the entire unit is made of linear polyamide (nylon), or of acetals and these have been found to be advantageous for certain uses. Yet neither the synthetic linear polyamide, generally known as nylon, or acetals have been found entirely satisfactory in that each has definite limitations as gear type couplings. Nylon, although of a plastic nature will, upon unforeseen and excessive gear tooth pressure or strain, give way through shearing of sleeve or gear teeth. Also, nylon, a plastic, is prone to drift and doesn't recover its original status or form while acetals do not have required fatigue resistance. The material that this invention proposes to incorporate in a flexible gear coupling is a polyurethane, an elastomer, which, it has been found, can be readily molded or cast into the shapes required; whereas the other plastic synthetics such as nylon or acetals generally have to be subjected to tooling and machining operations.

Polyurethane is a high tensile material that is sufficiently hard for use in couplings. It provides good resistance to impact and to abrasion. Perhaps its most important quality is its superior ability to recover from deformation. It will take a greater degree of parallel or angular misalignment than other gear type couplngs made of metal or synthetics such as linear polyamides or acetals. These qualities plus its lubricity provide for an improved attendance-free coupling. With properly designed gear teeth of the transmitting members of a coupling, there is provided by this invention a unit that is longer lasting and self-sustaining than those of other known plastics or synthetics.

A great advantage in the use of polyurethane materials is the ease of manufacture of coupling sleeves or of other parts. Expense is always a consideration and polyurethane polymers are readily cast molded or injection molded. Machining and manufacturing steps required of other plastics are thus minimized or eliminated. The advantages of the coupling of this invention will be apparent from the following description in conjunction with the associated drawings, where:

Figure 1:
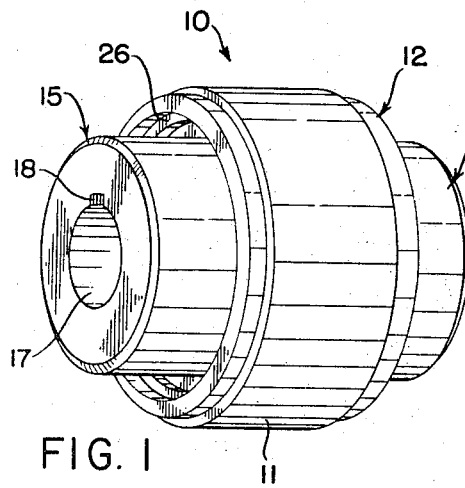
FIGURE 1 is a general representation of a self-aligning gear coupling.

FIGURE 1 represents an embodiment of a preferred design of a gear coupling used to transmit torque from a power source to a shaft operating other equipment. The coupling 10 comprises two abutting, yet spaced, steel hub members 14 and 15 positioned within or encompassed by a sleeve having an outer metallic reinforcing shell member 11. The hub members themselves are provided with shaft receiving openings 17 having key-ways 18 to secure them to a shaft.

Figure 2:
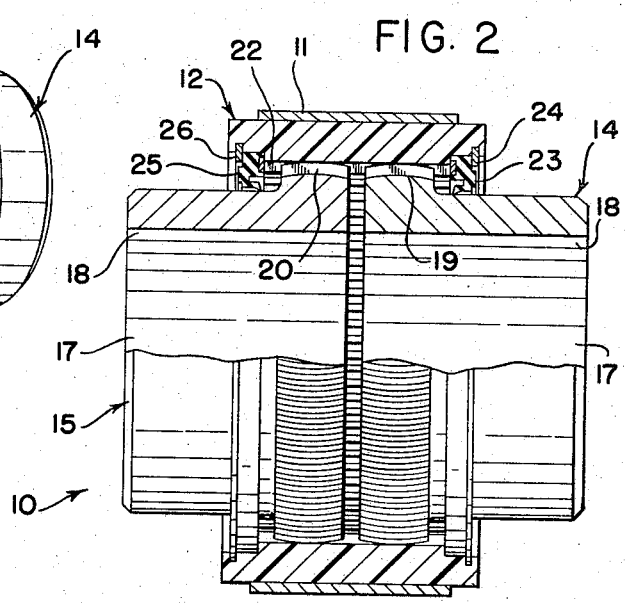
FIGURE 2 is a partial cross section of the assembled coupling of FIGURE 1 exposing the utilization of a polyurethane sleeve.

The hub members 14 and 15, as seen in FIGURE 2, are provided with flanges 19 and 20 having external teeth, desirably spherically involute cut and chamfered in a manner to provide for expected maximum displacement or misalignment between the driving and the driven shafts. The elastomeric sleeve 12 of the coupling 10 is positioned over the externally toothed flanges 19, 20 in tooth engaging relation. Sleeve 12 is advantageously made of a cross-linked polyurethane material that has been cast or molded into the required shape. The cross-linked polyurethane material is readily injection or cast molded into various such forms as into sleeves having internal teeth for receiving the toothed flanges 19 and 20 of hub members 14, 15. There is no problem in form casting or injection molding of the sleeve member since the teeth are flat sided and straight for their lengths.

A preferred pressure angle is one of 40° taken between the pitch line and the applied force. By means of the thin metallic cylinder or shell, the polyurethane sleeve is further, and advantageously, reinforced against distortion which could occur under unexpected conditions because of its elastomeric nature. When torque is suddenly increased, the spherically cut teeth of the hub gears partly embed themselves in the related impressed sleeve teeth without damage thereto. Also, Hertz and root stress calculations indicate vary large, if not 100%, contact between sleeve and hub teeth. Root stress controls. The polyurethane sleeve will readily accept distortion and return to its normal and initial shape.

Greater cross-sectional thickness could replace the reinforcement but such outsize need not be resorted to when it can be advantageously molded within a relatively thin metallic shell 11. The metallic reinforcing shell 11 also increases torque capacity beyond that available in an all urethane sleeves 12. It also provides for a uniform torsional resilience; it helps dissipate frictional heat developed by frictional heat developed by frictional tooth contact, especially at higher speeds; and with the higher pressure angle mentioned herein to urge in keeping the urethane teeth in a compressive state rather than in one of bending. Where the sleeve 12 is separately molded or cast, it is provided with slight shoulders at its end to prevent lateral displacement of the metal shell and, obviously, the shell can be glued.

The synthetic sleeve 12 is maintained against laterial displacement by means of snap rings 24, 26 provided in the sleeve ends and placed therein in annular grooves accepting them. End thrust elastic seals 23, 25 also may be utilized between the snap rings 24 and the gear hubs 19 and 20, as desired. Otherwise, the snap rings 24, 26 can be placed within the sleeve 12 into close relationship with the gear flanges 19 and 20. About the only machining of the polyurethane sleeve is the forming of the grooves accommodating the coil or snap rings 24, 26.

Figure 3:
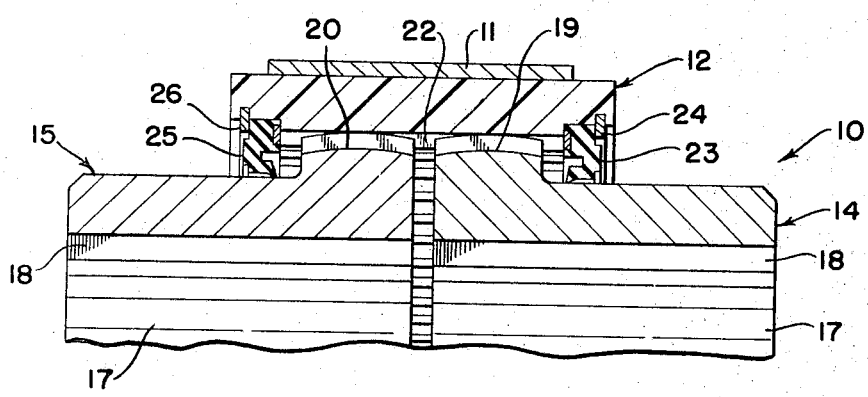
FIGURE 3 is a detail of FIGURE 2 showing specifically the construction and relationship of the various parts forming the coupling of FIGURE 1.

The positions of the various members of a coupling are shown in greater detail in FIGURE 3. The hubs 14 and 15, having geared flanges 19 and 20, are positioned within the polyurethane sleeve 12 in toothed or meshing contact. The sleeve 12 has extending longitudinally, internally facing formed gear teeth 22 which intermesh with the flange teeth of hubs 19 and 20. Because of its elastomeric nature, the sleeve 12 itself is preferably reinforced with a metallic cylinder 11 and the sleeve assembly is maintained against axial displacement by resilient and elastic end thrust seals 23, 25 backed up by metallic spring retainers 24, 26. Any displacement of hub 14 relative to hub 15, within design limits, will be absorbed by the polyurethane sleeve 12 and the geared hubs 19 and 20.

Figure 4:
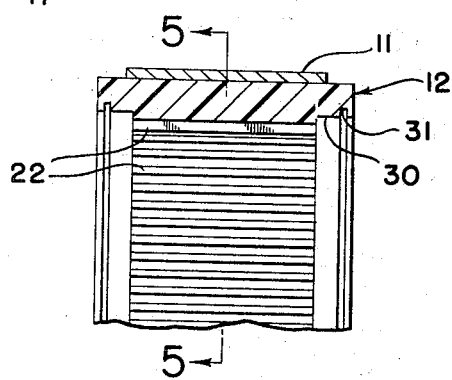
FIGURE 4 is a detail of the polyurethane sleeve and outer reinforcing metalic cylinder or shell.
Figure 5:
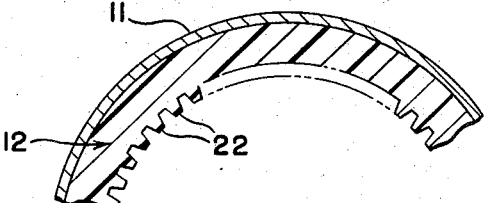
FIGURE 5 is a further detail taken across line 5—5 of FIGURE 4 of the polyurethane sleeve itself and its metallic reinforcing shell.

In FIGURES 4 and 5, the synthetic sleeve 12 is shown having gear teeth 22 cast for nearly about its full length. The sleeve 12 with gear teeth 22 is readily cast within the metallic shell 11 or it is placed therein. Also, the greater tooth pressure angle of 40° lends itself to easier casting of teeth that need no subsequent machining. The thin metal shell 11, as stated, can be sealed about or press-fit on the sleeve 12. The combination of the metallic shell or cylinder 11 and the polyurethane sleeve cast within it forms a unit that also contains annular grooves 30, 31 for the ready acceptance and assembly of seal 23, and its retainer 24 (see FIGURE 3).

Where other synthetic material such as nylon is used for an internally toothed sleeve member in a gear coupling, it also would derive extended benefits if it were enveloped by a metallic cylinder such as the metal shell 11. The nylon sleeve then would not need a thick base and the coupling would be stronger.

As herein stated, it is particularly advantageous to have the teeth of the hub flanges 19, 20 and of the sleeve 12 cut so that the tooth pressure angle is between about 38 and 43°, or about 40°. The contact forces placed on the teeth, because of such tooth pressure angle, are transmitted through them into their bases minimizing bending stresses. The larger tooth, the greater area of meshing contact, the elastomeric nature of polyurethane as well as its improved and inherent self-lubricating qualities advantageously provide for a long-wearing, torsionally resilient, tough coupling, needing very little, if any attendance. Urethane elastomers, further, are unique in that they do not crystallize even at temperatures as low as −80° F. Lubricity can also be incorporated into the elastomer, one common lubricant being molybdenum disulphide, although for the most purposes, none need be added. Furthermore, the coupling herein described is capable of increased capacity over all metal couplings under misalignment due to the flexing of the teeth of the polyurethane sleeve, both at the root and in compression.

What is claimed is:

1. In a flexible gear type shaft coupling in combination, a pair of complementary metallic shaft hubs each having gear teeth at one end, a one-piece cylindrical sleeve with internal teeth extending lengthwise over and in mesh relationship with the gear teeth of both said hubs, said sleeve being either cast or molded of polyurethane, an elastomer material, having self-lubricating qualities and resistance to abrasion, a metallic reinforcing shell positioned about and partly embedded in said sleeve, said sleeve being either cast or molded within said metallic shell extending in length substantially beyond either end thereof, and means positionable within the ends of said sleeve and in grooves therein being adapted to maintain it against displacement from about said gear hubs during rotation.

2. In a flexible gear type shaft coupling in combination, a pair of complementary metallic shaft hubs each having gear teeth involutely cut to a 40° pressure angle at one end, a one-piece cylindrical sleeve with internal straight and flat teeth cut to a 40° pressure angle extending lengthwise over and in mesh relationship with the gear teeth of both said hubs, said sleeve being either cast or molded of polyurethane, an elastomer material, having self-lubricating qualities and resistance to abrasion, a metallic reinforcing shell positioned about and partly embedded in said sleeve, said sleeve being either cast or molded within said metallic shell extending in length substantially beyond either end thereof, and means positionable within the ends of said sleeve and in grooves therein being adapted to maintain it against displacement from about said gear hubs during rotation.

References Cited by the Examiner

UNITED STATES PATENTS

| 2,655,798 | 10/1953 | Neher | 64—27 |
| 2,841,966 | 7/1958 | Belden et al. | 64—9 |
| 2,918,809 | 12/1959 | Miller | 64—9 |
| 2,924,954 | 2/1960 | Panhard | 64—9 |
| 2,945,365 | 7/1960 | Ulderup et al. | 64—11 |
| 2,974,501 | 3/1961 | Kaufman et al. | 64—9 |

FOREIGN PATENTS

| 207,400 | 11/1923 | Great Britain. |
| 216,241 | 5/1924 | Great Britain. |

FRED C. MATTERN, Jr., *Primary Examiner.*

HALL C. COE, *Examiner.*